(12) United States Patent
Menheere

(10) Patent No.: US 12,116,928 B2
(45) Date of Patent: Oct. 15, 2024

(54) AIRCRAFT ENGINE HAVING TWO RADIALLY OFFSET TURBINES

(71) Applicant: PRATT & WHITNEY CANADA CORP., Longueuil (CA)

(72) Inventor: David Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/185,007

(22) Filed: Mar. 16, 2023

(65) Prior Publication Data
US 2024/0309803 A1   Sep. 19, 2024

(51) Int. Cl.
| F02C 3/08 | (2006.01) |
| F02C 3/045 | (2006.01) |
| F02C 3/09 | (2006.01) |
| F02C 3/10 | (2006.01) |
| F02C 3/107 | (2006.01) |
| F02C 3/13 | (2006.01) |
| F02C 6/20 | (2006.01) |
| F02C 7/36 | (2006.01) |

(52) U.S. Cl.
CPC ............... *F02C 3/085* (2013.01); *F02C 6/20* (2013.01); *F02C 3/045* (2013.01); *F02C 3/08* (2013.01); *F02C 3/09* (2013.01); *F02C 3/10* (2013.01); *F02C 3/103* (2013.01); *F02C 3/107* (2013.01); *F02C 3/13* (2013.01); *F02C 7/36* (2013.01)

(58) Field of Classification Search
CPC .. F02C 3/04; F02C 3/045; F02C 3/062; F02C 3/08; F02C 3/085; F02C 3/09; F02C 3/10; F02C 3/103; F02C 3/107; F02C 3/13; F02C 6/20; F02C 7/32; F02C 7/36
See application file for complete search history.

(56) References Cited

U.S. PATENT DOCUMENTS

| 3,623,824 A | 11/1971 | Wilde et al. | |
| 2010/0247298 A1* | 9/2010 | Nakamura | F01D 11/18 |
| | | | 415/173.1 |
| 2013/0074516 A1* | 3/2013 | Heward | F02C 7/36 |
| | | | 60/786 |
| 2015/0308353 A1* | 10/2015 | Gardner | F02C 7/36 |
| | | | 60/773 |
| 2018/0266316 A1* | 9/2018 | Soulat | B64D 27/18 |
| 2018/0306121 A1* | 10/2018 | Curlier | F16H 1/203 |
| 2019/0309681 A1* | 10/2019 | Townes | F02C 3/13 |
| 2021/0231058 A1* | 7/2021 | Plante | F02C 7/32 |

* cited by examiner

*Primary Examiner* — Binh Q Tran
(74) *Attorney, Agent, or Firm* — NORTON ROSE FULBRIGHT CANADA LLP

(57) ABSTRACT

An aircraft engine, has: a high-pressure spool having a high-pressure turbine drivingly engaged to a high-pressure compressor; and a low-pressure spool having: a first low-pressure turbine downstream of the high-pressure turbine; and a second low-pressure turbine downstream of the first low-pressure turbine, one or more of the first low-pressure turbine and the second low-pressure turbine drivingly engaged to a rotatable load, the first low-pressure turbine and the second low-pressure turbine radially offset from one another relative to a central axis of the aircraft engine.

20 Claims, 5 Drawing Sheets

AIRCRAFT ENGINE HAVING TWO RADIALLY OFFSET TURBINES

TECHNICAL FIELD

The application relates generally to aircraft engines and, more particularly, to turbine sections used in such engines.

BACKGROUND

Aircraft engines, such as gas turbine engines, include turbine sections that extract energy from combustion gases to drive one or more load, such as, for instance, a fan, a propeller, a generator, a compressor and so on. In some applications, the gas turbine engines include two or more spools rotating independently from one another. A turbine is provided on each of the two or more spools. Typically, these turbines are axially stacked one after the other. In some cases, this may be problematic for some application. Improvements are therefore sought.

SUMMARY

In one aspect, there is provided an aircraft engine, comprising: a high-pressure spool having a high-pressure turbine drivingly engaged to a high-pressure compressor; and a low-pressure spool having: a first low-pressure turbine downstream of the high-pressure turbine; and a second low-pressure turbine downstream of the first low-pressure turbine, one or more of the first low-pressure turbine and the second low-pressure turbine drivingly engaged to a rotatable load, the first low-pressure turbine and the second low-pressure turbine radially offset from one another relative to a central axis of the aircraft engine.

The aircraft engine described above may include any of the following features, in any combinations.

In some embodiments, the first low-pressure turbine at least partially axially overlaps the second low-pressure turbine relative to the central axis.

In some embodiments, the high-pressure spool is axially offset from the low-pressure spool relative to the central axis.

In some embodiments, the high-pressure turbine is drivingly engaged to the high-pressure compressor via a high-pressure shaft, the one or more of the first low-pressure turbine and the second low-pressure turbine drivingly engaged to the rotatable load via a low-pressure shaft, the high-pressure shaft axially offset from the low-pressure shaft.

In some embodiments, the first low-pressure turbine is a first centrifugal turbine having a first turbine inlet facing a direction being mainly axial and a first turbine outlet facing a direction being mainly radial.

In some embodiments, the second low-pressure turbine is a second centrifugal turbine having a second turbine inlet facing a direction being mainly radial and a second turbine outlet facing a direction being mainly axial.

In some embodiments, a flow path extends through the first low-pressure turbine and through the second low-pressure turbine, the flow path extending in a first direction while entering the first low-pressure turbine and extending in a second direction opposite the first direction while exiting the second low-pressure turbine.

In some embodiments, the second low-pressure turbine is drivingly engaged to the rotatable load via a direct driving engagement, a speed ratio of a rotational speed of the second low-pressure turbine to a rotational speed of the rotatable load equals to 1.

In some embodiments, the first low-pressure turbine is drivingly engaged to the rotatable load via a direct driving engagement, a speed ratio of a rotational speed of the first low-pressure turbine to the rotational speed of the rotatable load equal to 1.

In some embodiments, the first low-pressure turbine is drivingly engaged to the rotatable load via a gearbox, a speed ratio of a rotational speed of the first low-pressure turbine to the rotational speed of the rotatable load different than 1.

In another aspect, there is provided a turbine section for an aircraft engine, comprising: a high-pressure turbine; a first low-pressure turbine drivingly engageable with a rotatable load; and a second low-pressure turbine in fluid flow communication with the first low-pressure turbine and drivingly engageable with the rotatable load, a flow path extending through the first low-pressure turbine and through the second low-pressure turbine, the flow path extending in a direction being mainly radial relative to a central axis of the turbine section from the first low-pressure turbine to the second low-pressure turbine.

The turbine section described above may include any of the following features, in any combinations.

In some embodiments, the first low-pressure turbine axially overlaps the second low-pressure turbine relative to the central axis.

In some embodiments, the first low-pressure turbine is a first centrifugal turbine having a first turbine inlet facing a direction being mainly axial and a first turbine outlet facing a direction being mainly radial.

In some embodiments, the second low-pressure turbine is a second centrifugal turbine having a second turbine inlet facing a direction being mainly radial and a second turbine outlet facing a direction being mainly axial.

In some embodiments, the flow path extends in a first direction while entering the first low-pressure turbine and extending in a second direction opposite the first direction while exiting the second low-pressure turbine.

In some embodiments, the second low-pressure turbine is drivingly engaged to the rotatable load via a direct driving engagement, a speed ratio of a rotational speed of the second low-pressure turbine to a rotational speed of the rotatable load equal to 1.

In some embodiments, the first low-pressure turbine is drivingly engaged to the rotatable load via a direct driving engagement, a speed ratio of a rotational speed of the first low-pressure turbine to the rotational speed of the rotatable load equal to 1.

In some embodiments, the first low-pressure turbine is drivingly engaged to the rotatable load via a gearbox, a speed ratio of a rotational speed of the first low-pressure turbine to the rotational speed of the rotatable load different than 1.

In yet another aspect, there is provided a method of driving a rotatable load of an aircraft engine, comprising: flowing combustion gases through a first low-pressure turbine; flowing the combustion gases from the first low-pressure turbine to a second low-pressure turbine being radially offset from the first low-pressure turbine relative to a central axis of the aircraft engine; and driving the rotatable load with one or more of the first low-pressure turbine and the second low-pressure turbine.

In some embodiments, the flowing of the combustion gases from the first low-pressure turbine to the second low-pressure turbine includes flowing the combustion gases from the first low-pressure turbine to the second low-pressure turbine axially overlapping the first low-pressure turbine.

BRIEF DESCRIPTION OF THE DRAWINGS

Reference is now made to the accompanying figures in which.

DETAILED DESCRIPTION

Figure 1:
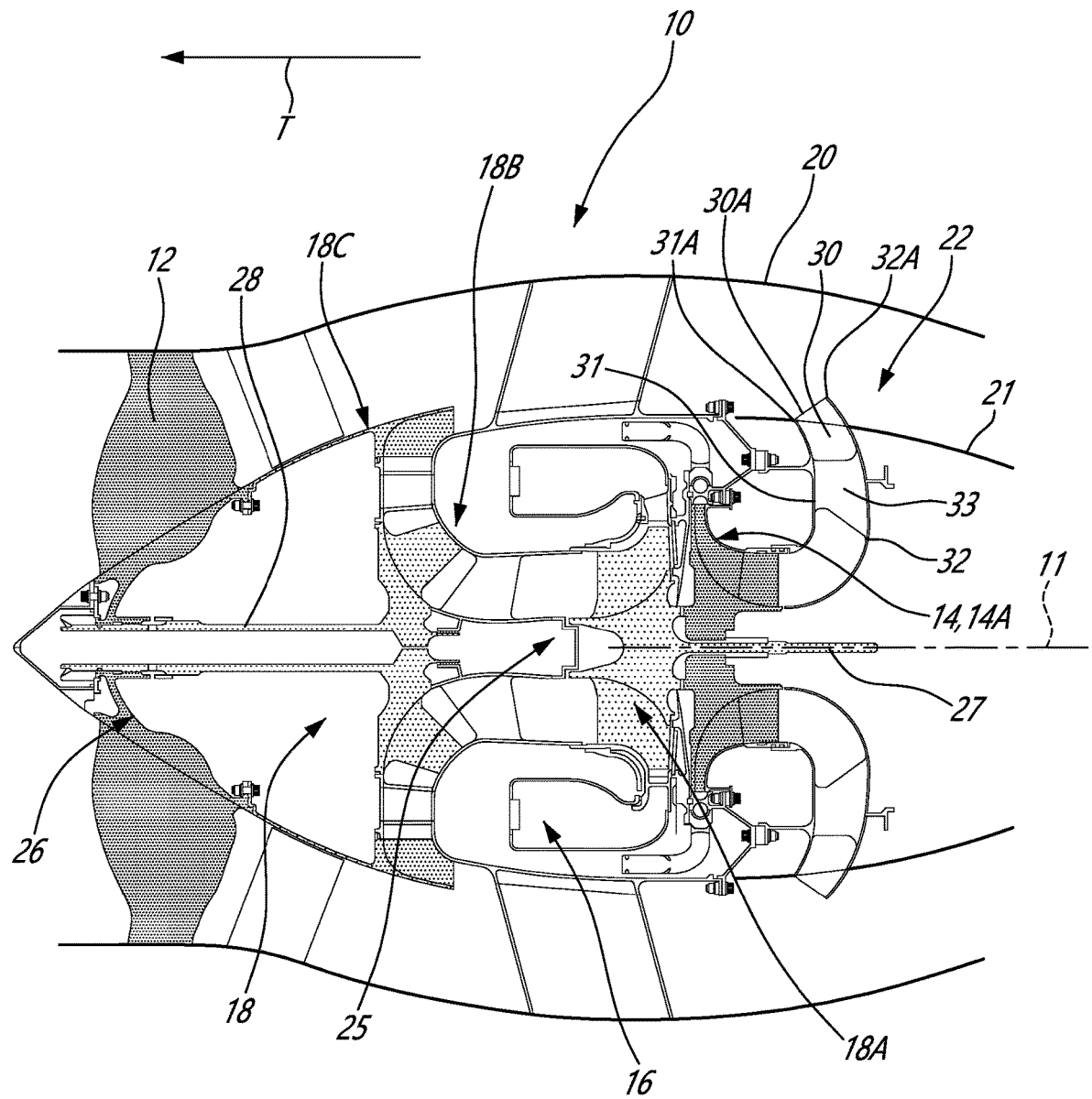
FIG. 1 is a schematic cross sectional view of an aircraft engine depicted as a gas turbine engine in accordance with one embodiment.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

The gas turbine engine 10 includes an outer casing 20 and an inner casing 21 located radially inwardly of the outer casing 20 relative to the central axis 11 of the gas turbine engine 10. A bypass duct 22 is defined radially between the outer casing 20 and the inner casing 21. The fan 12 has blades that extend across the bypass duct 22. A core of the gas turbine engine 10, which includes the compressor section 14, the combustor 16, and the turbine section 18, is disposed radially inwardly of the inner casing 21 relative to the central axis 11.

The gas turbine engine 10 has a high-pressure spool 25 and a low-pressure spool 26. The high-pressure spool 25 and the low-pressure spool 26 are herein axially offset from one another. The high-pressure spool 25 includes a high-pressure turbine 18A of the turbine section 18 and a high-pressure compressor 14A of the compressor section 14. The high-pressure turbine 18A is drivingly engaged to the high-pressure compressor 14A via a high-pressure shaft 27. The low-pressure spool 26 includes a first low-pressure turbine 18B of the turbine section 18 and a second low-pressure turbine 18C of the turbine section 18 located downstream of the first low-pressure turbine 18B. In the embodiment shown, both of the first low-pressure turbine 18B and the second low-pressure turbine 18C are drivingly engaged to a rotatable load, which herein corresponds to the fan 12. More detail about this engagement are provided below. In some other embodiments, the rotatable load may correspond to an output shaft, a propeller, a generator, and so on.

In this embodiment, the gas turbine engine 10 is devoid of a low-pressure, or boost, compressor. It will however be appreciated that, in other embodiments, a low-pressure compressor may be provided. This low-pressure compressor would be drivingly engaged by one or more of the first low-pressure turbine 18B and the second low-pressure turbine 18C either directly or via a gearbox.

Still referring to FIG. 1, the gas turbine engine 10 is a reverse-flow engine in that a flow of air and combustion gases through the core extends in a same direction as a direction of travel T of the gas turbine engine 10, that is, from a rear end of the engine towards a front end of the engine. More specifically, air enters the compressor section 14 via an inlet that is in fluid flow communication with the bypass duct 22. In other words, the compressor section 14 is fed with air extracted, suctioned, or drawn from the bypass duct 22.

The inlet is defined by an annular intake conduit 30 that is located between a first annular intake wall 31 and a second annular intake wall 32. The first annular intake wall 31 is axially forward of the second annular intake wall 32 relative to the central axis 11. Herein, "axially forward" is in reference to the direction of travel T. Thus, in the embodiment shown, the first annular intake wall 31 is axially closer to the fan 12 than the second annular intake wall 32. The first annular intake wall 31 has an upstream edge 31A radially recessed inwardly from an upstream edge 32A of the second annular intake wall 32 to create an annular inlet 30A of the annular intake conduit 30. The annular inlet 30A faces a direction having an axial component relative to the central axis 11. In the present embodiment, the annular inlet 30A is arranged to scoop a portion of a flow of air flowing through the bypass duct 22. The annular inlet 30A herein faces the direction of travel T so that air pushed through the bypass duct 22 by the fan 12 is intersected by the annular inlet 30A. It will be appreciated that, in another embodiment, the annular intake conduit 30 may be replaced by a plurality of intake pipes circumferentially distributed about the central axis 11.

The first annular intake wall 31 is secured to the second annular intake wall 32 via struts 33 circumferentially distributed about the central axis 11 and used to orient the flow appropriately to meet blades of the high-pressure compressor 14A, which is herein a centrifugal compressor having an impeller. In the present embodiment, the annular intake conduit 30 curves to rotate the air received via the annular inlet 30A from a substantially axially rearward direction to an axially forward direction as it meets the impeller of the high-pressure compressor 14A.

The impeller of the high-pressure compressor 14A defines flow passages between blades and the flow is deviated from being oriented substantially axially as it enters the flow passages to being oriented substantially radially as it exits the flow passage. A diffuser, which may include a plurality of diffuser pipes or diffuser vanes, redirect the flow in a direction being mainly axial. The compressed air exiting the diffuser then flows through the combustor 16 where it is mixed with fuel to generate combustion gases whose energy is extracted by the turbine section 18.

For some applications, the axial length of an aircraft engine is an important parameter for performance, efficiency, aerodynamic considerations, and so on. The present disclosure aims at reducing an axial length of the gas turbine engine 10 compared to other gas turbine engines of similar power ratings. Herein, this is done by radially stacking two turbines of the turbine section 18.

Still referring to FIG. 1, in the embodiment shown, the first low-pressure turbine 18B and the second low-pressure turbine 18C are radially offset from one another relative to the central axis 11. More specifically, the second low-pressure turbine 18C is located radially outwardly of the first low-pressure turbine 18B relative to the central axis 11. In some other embodiments, the second low-pressure turbine 18C may be located radially inwardly of the first low-pressure turbine 18B. Having this radial offset between the first low-pressure turbine 18B and the second low-pressure turbine 18C may allow to shorten an axial length of the turbine section 18 compared to a configuration in which the two turbines are substantially radially aligned.

In the present configuration, the first low-pressure turbine 18B at least partially axially overlaps the second low-pressure turbine 18C. Herein, the first low-pressure turbine 18B and the second low-pressure turbine 18C are axially aligned one above the other relative to the central axis 11. This axial overlap may further help in minimizing the axial length of the turbine section 18 and, thus of the gas turbine engine 10.

Moreover, since the gas turbine engine 10 is a reverse flow engine, the combustion gases expelled from the combustor 16 are re-oriented axially rearward before they are released back in the environment outside the gas turbine engine 10. The disclosed configuration may allow to extract power from the combustion gases simultaneously as they are rotated about 180 degrees towards a rear end of the gas turbine engine 10.

Figure 2:
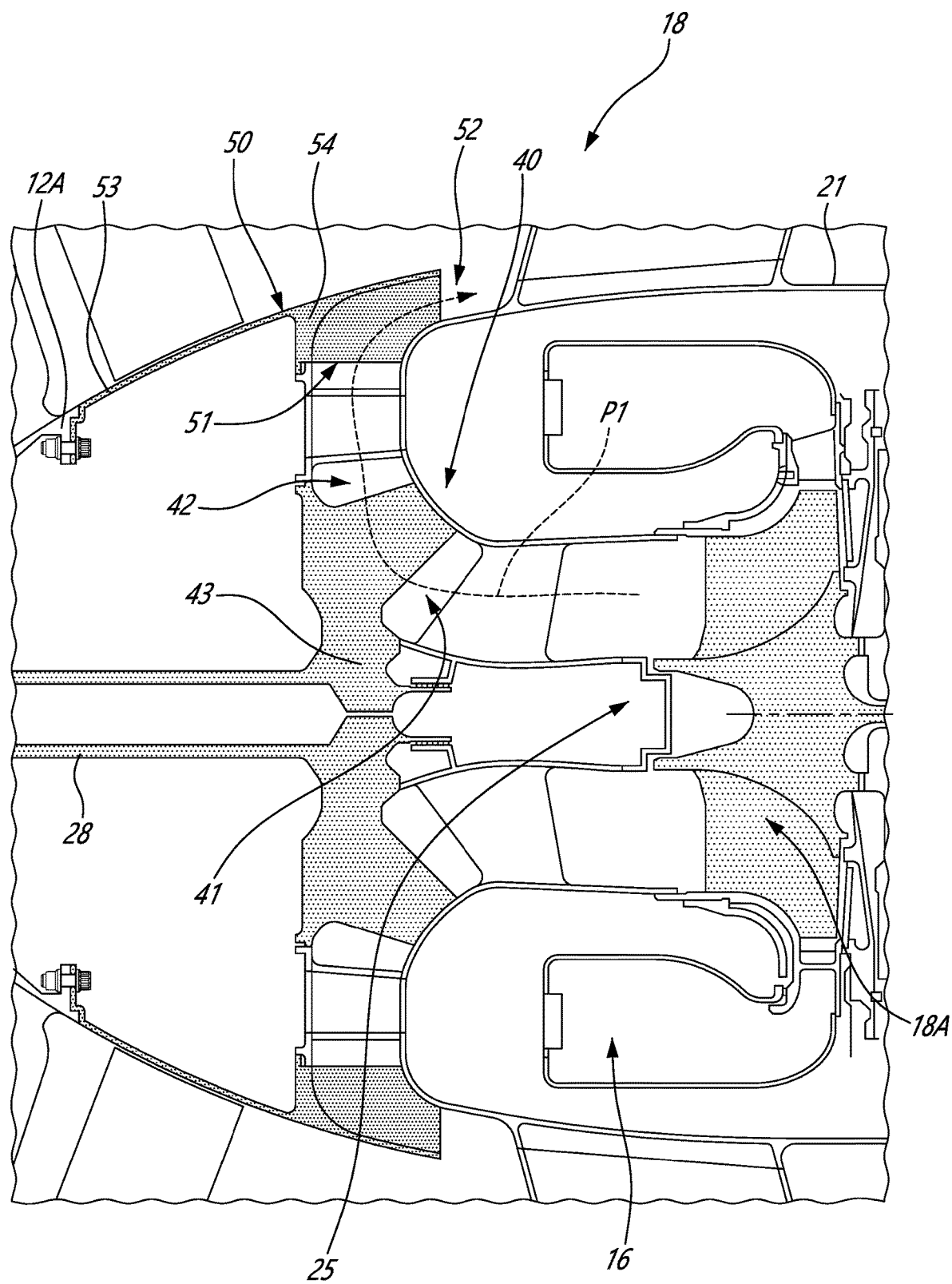
FIG. 2 is an enlarged view of a turbine section of the gas turbine engine of FIG. 1.

Referring more particularly to FIG. 2 that illustrates an enlarged view of the turbine section 18. The first low-pressure turbine 18B is a first centrifugal turbine 40 having a first turbine inlet 41 facing a direction being mainly axial and a first turbine outlet 42 facing a direction being mainly radial. Herein, the expression "mainly" as in "mainly axial" implies that an axial component of the direction is predominant (e.g., 50% or more). It is however appreciated that the flow entering and exiting the first centrifugal turbine 40 may flow along a direction having a circumferential component relative to the central axis 11. Thus, in such a case, the expression "mainly" as in "mainly axial" implies that the axial component is greater than the radial component. The expression "mainly radial" implies that the radial component is greater than the axial component. The second low-pressure turbine 18C is a second centrifugal turbine 50 having a second turbine inlet 51 facing a direction being mainly radial and a second turbine outlet 52 facing a direction being mainly axial relative to the central axis 11.

Therefore, the combustion gases exiting the high-pressure turbine 18A flow along a flow path P1 that extends through the first centrifugal turbine 40 via the first turbine inlet 41 along a first direction being mainly axial relative to the central axis 11, that exits the first low-pressure turbine 18B via the first turbine outlet 42 along a direction being mainly radial relative to the central axis 11, extends the second centrifugal turbine 50 via the second turbine inlet 51 along a direction being mainly radial, and exits the second centrifugal turbine 50 via the second turbine outlet 52 along a second direction being mainly axial and substantially opposite the first direction. Put differently, the combustion gases turn about 180 degrees as they flow through both of the first centrifugal turbine 40 and the second centrifugal turbine 50. Stated otherwise, the flow path P1 extends in a first direction while entering the first low-pressure turbine 18B and extends in a second direction opposite the first direction while exiting the second low-pressure turbine 18C.

It will be appreciated that, in some other embodiments, the first low-pressure turbine 18B and the second low-pressure turbine 18C may be axial turbines. In such a case, suitable ducting are used to turn the flow allowing it to exit the first low-pressure turbine 18B to reach the second low-pressure turbine 18C, which is radially offset form the first low-pressure turbine 18B.

The first centrifugal turbine 40 is drivingly engaged to a low-pressure shaft 28 via which it drives the fan 12. The low-pressure shaft 28 is herein axially offset from the high-pressure shaft 27. In other words, in this embodiment, there is no axial overlap between these two shafts. Other configurations are contemplated. As shown in FIG. 1, a coupling engagement is provided between the low-pressure shaft 28 and the fan 12. More particularly, the first centrifugal turbine 40 has a first hub 43 from which blades protrude. The first hub 43 is secured to the low-pressure shaft 28. In some embodiments, the first hub 43 may be monolithically connected to the low-pressure shaft 28.

The second centrifugal turbine 50 is drivingly engaged to the fan 12 via an annular flange 53 that extends circumferentially around the central axis 11. The annular flange 53 may be fully annular. In some other embodiments, the annular flange 53 may be replaced by a plurality of members circumferentially distributed about the central axis 11. The second centrifugal turbine 50 has a second hub 54 and the annular flange 53 is secured to the second hub 54. Herein, the annular flange 53 monolithically protrudes from the second hub 54. The annular flange 53 is secured to a mating flange 12A of the fan 12 via any suitable means such as fasteners.

Therefore, in the depicted embodiment, two parallel load paths are provide from the low-pressure turbines to the fan 12. A first load path extends from the first low-pressure turbine 18B to the fan 12 via the low-pressure shaft 28 and a second load path extends from the second low-pressure turbine 18C to the fan 12 via the annular flange 53. Therefore, in this embodiment, the first low-pressure turbine 18B and the second low-pressure turbine 18C rotate at a same rotational speed, which also corresponds to a rotational speed of the fan 12. In other words, the second low-pressure turbine 18C is drivingly engaged to the fan 12 via a direct driving engagement. A speed ratio of a rotational speed of the second low-pressure turbine 18C to a rotational speed of the fan 12 equals to 1. Similarly, the first low-pressure turbine 18B is drivingly engaged to the fan 12 via a direct driving engagement. A speed ratio of a rotational speed of the first low-pressure turbine 18B to the rotational speed of the rotatable load (e.g., fan 12) equals to 1. As will be discussed below, this need not be the case.

Still referring to FIG. 2, in the present embodiment, the second turbine outlet 52 is annular and defined radially between the second hub 54 and a portion of the inner casing 21. The second turbine outlet 52 faces a direction substantially parallel to a direction of the air flowing within the bypass duct 22. The second turbine outlet 52 may be radially offset from the annular inlet 30A (FIG. 1) of the annular intake conduit 30 to limit the combustion gases from being ingested into the compressor section 14.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also benefit from the previously disclosed features.

Figure 3:
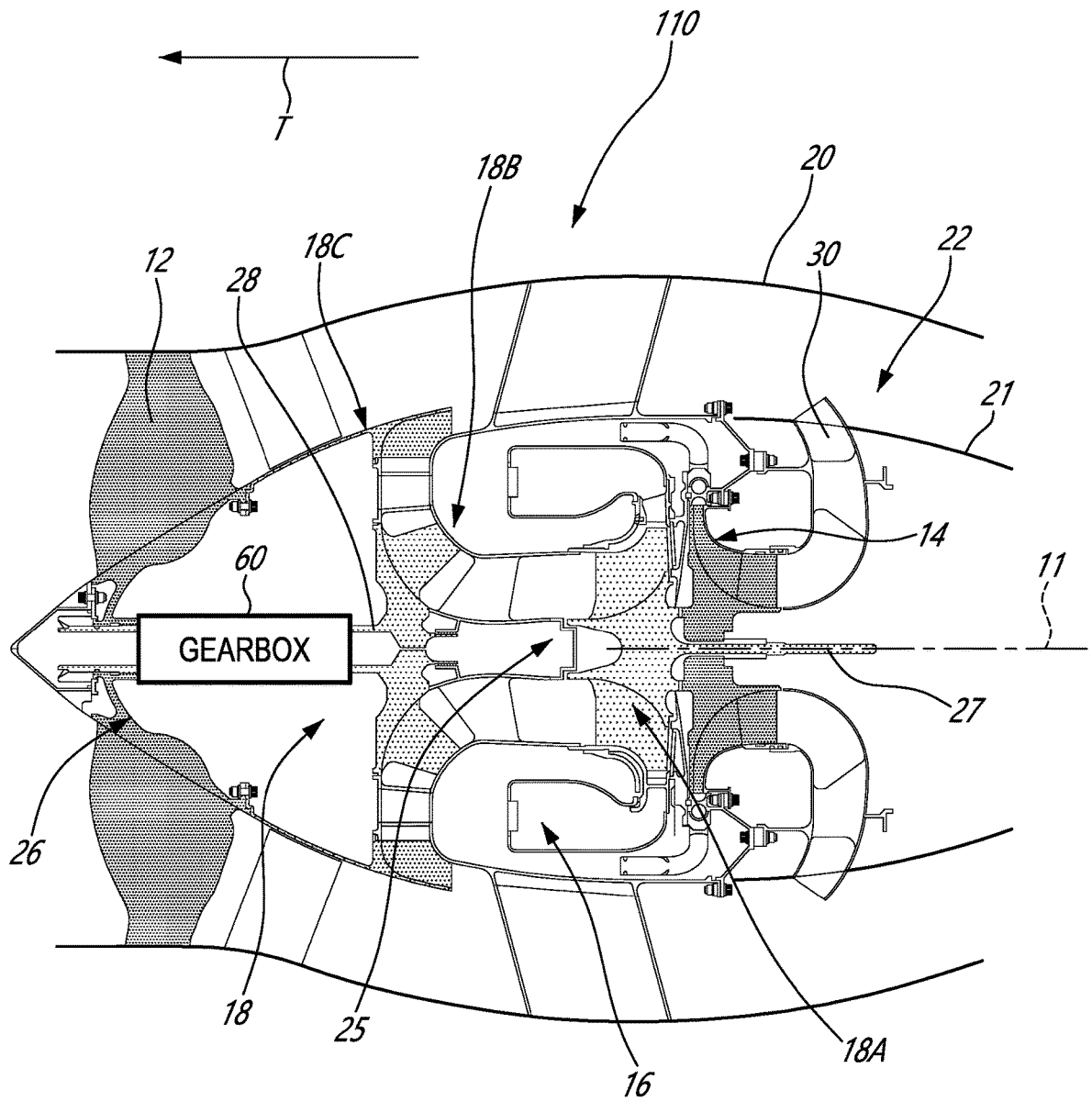
FIG. 3 is a schematic cross sectional view of an aircraft engine depicted as a gas turbine engine in accordance with another embodiment.

Referring now to FIG. 3, another embodiment of a gas turbine engine is shown at 110. For the sake of conciseness, only features differing form the gas turbine engine 10 of FIGS. 1-2 are described below.

In the present embodiment, the first low-pressure turbine 18B is drivingly engaged to the fan 12 via a gearbox 60. The gearbox 60 may thus allow the first low-pressure turbine 18B to rotate at a different speed (e.g., faster) than the second low-pressure turbine 18C. This may allow efficiency gains compared to the configuration of FIG. 1 in which both low-pressure turbines rotate at the same speed. Thus, in the embodiment shown, a speed ratio of a rotational speed of the first low-pressure turbine 18B to the rotational speed of the fan 12 is different than 1. A speed ratio of a rotational speed of the first low-pressure turbine 18B to the rotational speed of the second low-pressure turbine 18C is different than 1. A speed ratio of the rotational speed of the second low-pressure turbine 18C to the rotational speed of the fan 12 is 1, but may be different than one in other configurations in which another gearbox interconnects the second low-pressure turbine 18C to the fan 12.

The gearbox 60 may include a sun gear driven by the low-pressure shaft 28, planet gears meshed with the sun gear and rotatably supported by a planet carrier, and a ring gear meshed with the planet gears. The fan 12 may be drivingly engaged by one of the planet carrier and the ring gear while rotation of the other of the planet carrier and the ring gear is blocked. In some embodiments, the gearbox 60 may vary a speed ratio between the first low-pressure turbine 18B and the fan 12.

Figure 4:
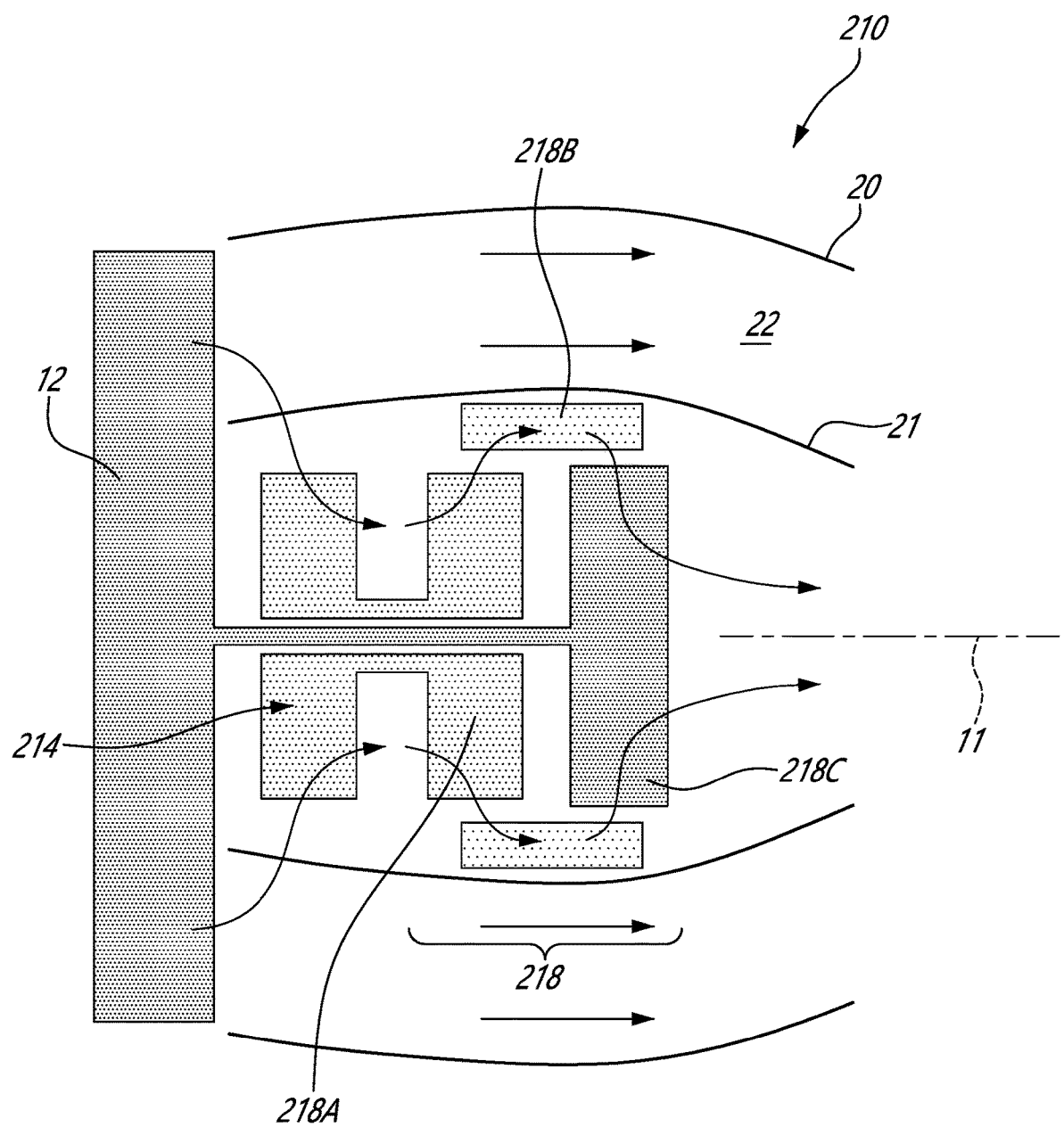
FIG. 4 is a schematic cross sectional view of an aircraft engine depicted as a gas turbine engine in accordance with yet another embodiment.

Referring now to FIG. 4, another embodiment of a gas turbine engine is shown at 210. For the sake of conciseness, only features differing from the gas turbine engine 10 of FIGS. 1-2 are described below.

In the embodiment shown, the gas turbine engine 210 is a turbofan engine in which air flows through the compressor section 214 and turbine section 218 in an opposite direction as the direction of travel T, that is, from a front end of the engine to a rear end of the engine. The gas turbine engine 210 includes a high-pressure turbine 218A that receives combustion gases from the combustor. The high-pressure turbine 218A is herein a centrifugal turbine including an impeller, but may alternatively be an axial turbine. The high-pressure turbine 218A has an inlet facing a direction being mainly axial and an outlet facing a direction being mainly radial relative to the central axis 11.

The turbine section 218 further includes a first low-pressure turbine 218B and a second low-pressure turbine 218C located downstream of the first low-pressure turbine 218B. As aforementioned, the first low-pressure turbine 218B and the second low-pressure turbine 218C may be both drivingly engaged to the fan 12, or other rotatable load. The first low-pressure turbine 218B is in the present embodiment an axial turbine having axially-oriented inlet and outlet, but may alternatively be a centrifugal turbine. Pipes or vanes are used to re-orient the combustion gases from being substantially radial as they exit the high-pressure turbine 218A to be oriented substantially axially as they enter the first low-pressure turbine 218B. Pipes or vanes are used to re-orient the combustion gases from being substantially axial as they exit the first low-pressure turbine 218B to be oriented substantially radially as they enter the second low-pressure turbine 218C. The second low-pressure turbine 218C is herein a centrifugal turbine having a radially oriented inlet and an axially oriented outlet. The second low-pressure turbine 218C may alternatively be an axial turbine. As for the configurations depicted in FIGS. 1-3, the first low-pressure turbine 218B and the second low-pressure turbine 218C are radially offset from one another and are herein at least partially axially overlapping each other. This may contribute in reducing an axial length of the gas turbine engine 210 compared to a configuration in which the two low-pressure turbines are not radially offset from one another.

Figure 5:
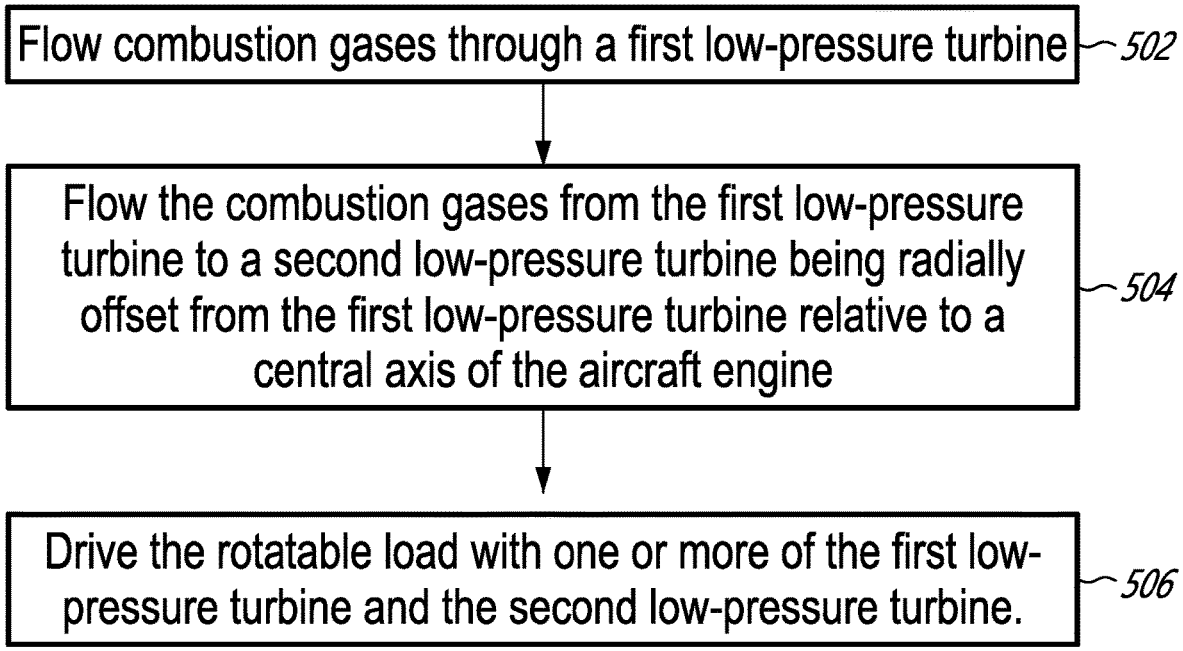
FIG. 5 is a flowchart illustrating steps of driving a rotatable load of the aircraft engine of FIG. 1.

Referring now to FIG. 5, a method of driving a rotatable load is shown at 500 and includes flowing the combustion gases through the first low-pressure turbine 18B, 218B at 502; flowing the combustion gases from the first low-pressure turbine 18B, 218B to the second low-pressure turbine 18C, 218C being radially offset from the first low-pressure turbine 18B, 218B relative to the central axis 11 at 504; and driving the rotatable load with one or more of the first low-pressure turbine 18B, 218B and the second low-pressure turbine 18C, 218C.

In the present embodiment, the flowing of the combustion gases from the first low-pressure turbine 18B, 218B to the second low-pressure turbine 18C, 218C at 504 may include flowing the combustion gases from the first low-pressure turbine 18B, 218B to the second low-pressure turbine 18C, 218C axially overlapping the first low-pressure turbine 18B, 218B.

In the context of the present disclosure, the expression "about" implies variations of plus or minus 10%.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
   a high-pressure spool having a high-pressure turbine drivingly engaged to a high-pressure compressor; and
   a low-pressure spool being coaxial with the high-pressure spool, the low-pressure spool having:
   a first low-pressure turbine downstream of the high-pressure turbine; and
   a second low-pressure turbine downstream of the first low-pressure turbine, one or more of the first low-pressure turbine and the second low-pressure turbine drivingly engaged to a rotatable load, the first low-pressure turbine and the second low-pressure turbine radially offset from one another relative to a central axis of the aircraft engine, the first low-pressure turbine being coaxial with the second low-pressure turbine.

2. The aircraft engine of claim 1, wherein the first low-pressure turbine at least partially axially overlaps the second low-pressure turbine relative to the central axis.

3. The aircraft engine of claim 1, wherein the high-pressure spool is axially offset from the low-pressure spool relative to the central axis.

4. The aircraft engine of claim 3, wherein the high-pressure turbine is drivingly engaged to the high-pressure compressor via a high-pressure shaft, the one or more of the first low-pressure turbine and the second low-pressure turbine drivingly engaged to the rotatable load via a low-pressure shaft, the high-pressure shaft axially offset from the low-pressure shaft.

5. The aircraft engine of claim 1, wherein the first low-pressure turbine is a first centrifugal turbine having a first turbine inlet facing a direction being mainly axial and a first turbine outlet facing a direction being mainly radial.

6. The aircraft engine of claim 5, wherein the second low-pressure turbine is a second centrifugal turbine having a second turbine inlet facing a direction being mainly radial and a second turbine outlet facing a direction being mainly axial.

7. The aircraft engine of claim 6, wherein a flow path extends through the first low-pressure turbine and through the second low-pressure turbine, the flow path extending in a first direction while entering the first low-pressure turbine and extending in a second direction opposite the first direction while exiting the second low-pressure turbine.

8. The aircraft engine of claim 1, wherein the second low-pressure turbine is drivingly engaged to the rotatable load via a direct driving engagement, a speed ratio of a rotational speed of the second low-pressure turbine to a rotational speed of the rotatable load equals to 1.

9. The aircraft engine of claim 8, wherein the first low-pressure turbine is drivingly engaged to the rotatable load via a direct driving engagement, a speed ratio of a rotational speed of the first low-pressure turbine to the rotational speed of the rotatable load equal to 1.

10. The aircraft engine of claim 8, wherein the first low-pressure turbine is drivingly engaged to the rotatable load via a gearbox, a speed ratio of a rotational speed of the first low-pressure turbine to the rotational speed of the rotatable load different than 1.

11. A turbine section for an aircraft engine, comprising:
a high-pressure turbine rotatable about a central axis of the aircraft engine;
a first low-pressure turbine drivingly engageable with a rotatable load and rotatable about the central axis; and
a second low-pressure turbine rotatable about the central axis and in fluid flow communication with the first low-pressure turbine and drivingly engageable with the rotatable load, a flow path extending through the first low-pressure turbine and through the second low-pressure turbine, the flow path extending in a direction being mainly radial relative to a central axis of the turbine section from the first low-pressure turbine to the second low-pressure turbine.

12. The turbine section of claim 11, wherein the first low-pressure turbine axially overlaps the second low-pressure turbine relative to the central axis.

13. The turbine section of claim 11, wherein the first low-pressure turbine is a first centrifugal turbine having a first turbine inlet facing a direction being mainly axial and a first turbine outlet facing a direction being mainly radial.

14. The turbine section of claim 13, wherein the second low-pressure turbine is a second centrifugal turbine having a second turbine inlet facing a direction being mainly radial and a second turbine outlet facing a direction being mainly axial.

15. The turbine section of claim 14, wherein the flow path extends in a first direction while entering the first low-pressure turbine and extending in a second direction opposite the first direction while exiting the second low-pressure turbine.

16. The turbine section of claim 11, wherein the second low-pressure turbine is drivingly engaged to the rotatable load via a direct driving engagement, a speed ratio of a rotational speed of the second low-pressure turbine to a rotational speed of the rotatable load equal to 1.

17. The turbine section of claim 16, wherein the first low-pressure turbine is drivingly engaged to the rotatable load via a direct driving engagement, a speed ratio of a rotational speed of the first low-pressure turbine to the rotational speed of the rotatable load equal to 1.

18. The turbine section of claim 16, wherein the first low-pressure turbine is drivingly engaged to the rotatable load via a gearbox, a speed ratio of a rotational speed of the first low-pressure turbine to the rotational speed of the rotatable load different than 1.

19. A method of driving a rotatable load of an aircraft engine, comprising:
flowing combustion gases through a first low-pressure turbine;
flowing the combustion gases from the first low-pressure turbine to a second low-pressure turbine being radially offset from the first low-pressure turbine relative to a central axis of the aircraft engine, the first low-pressure turbine being coaxial with the second low-pressure turbine; and
driving the rotatable load with one or more of the first low-pressure turbine and the second low-pressure turbine.

20. The method of claim 19, wherein the flowing of the combustion gases from the first low-pressure turbine to the second low-pressure turbine includes flowing the combustion gases from the first low-pressure turbine to the second low-pressure turbine axially overlapping the first low-pressure turbine.

* * * * *